United States Patent [19]

Kaku et al.

[11] Patent Number: 4,862,300
[45] Date of Patent: Aug. 29, 1989

[54] TAPE GUIDE MOVING MECHANISM FOR MAGNETIC RECORD REPRODUCING APPARATUS

[75] Inventors: Nobuyuki Kaku; Kenji Ogiro; Atsuo Osawa; Takashi Sasaki; Kouhei Takita, all of Yokohama, Japan

[73] Assignee: Hitachi, Ltd., Tokyo, Japan

[21] Appl. No.: 111,426

[22] Filed: Oct. 22, 1987

[30] Foreign Application Priority Data

Oct. 22, 1986 [JP] Japan ................................. 61-249658

[51] Int. Cl.$^4$ ......................................... G11B 15/665
[52] U.S. Cl. .................................................... 360/85
[58] Field of Search ......................................... 360/85

[56] References Cited

U.S. PATENT DOCUMENTS

| 3,864,742 | 2/1975 | Katoh | 360/85 |
| 4,357,639 | 11/1982 | Hama et al. | 360/85 |
| 4,661,864 | 4/1987 | Kuwajima | 360/85 |
| 4,697,214 | 9/1987 | Sasakawa | 360/85 |

FOREIGN PATENT DOCUMENTS 55-160362  12/1980  Japan .

*Primary Examiner*—Robert S. Tupper
*Attorney, Agent, or Firm*—Antonelli, Terry & Wands

[57] ABSTRACT

A tape guide moving mechanism for use with magnetic tape reproducing apparatus having a cylindrical cylinder mounted with a rotatable magnetic head thereon, and adapted to draw a magnetic tape from a tape cartridge and wound the magnetic tape on the cylindrical outer surface of said cylinder, comprising: a plurality of tape guides having a first group of tape guides and a second group of tape guides, drawing out the magnetic tape in a direction parallel to a plane perpendicular to the rotating axes of said supply and take-up reels; and drawing out the magnetic tape through said second position in slanting relation to a plane perpendicular to the rotating axis of said supply and take-up reel and winding said thus drawn magnetic tape around said cylinder in slanting relation to the plane section thereof.

20 Claims, 17 Drawing Sheets 4,862,300

TAPE GUIDE MOVING MECHANISM FOR MAGNETIC RECORD REPRODUCING APPARATUS

BACKGROUND OF THE INVENTION

This invention relates to magnetic record reproducing apparatus, and more particularly to a tape guide moving mechanism which defines a predetermined running path of the magnetic tape being drawn out of the cassette.

In general, there has been an increasing number of tape guides for loading in design employed in such apparatus and the like e.g. typically in the case of a small-diameter cylinder system in common use for a camera with a video tape recorder (or what is often called the Video Camera Recorder) or a wide-angle winding system in an 8 mm video system all of which have recently been developed. Moreover, it should be noted that continuous efforts have been made in the art for further smoothing of the tape surface and for reducing tape thickness with a view toward attaining improvements on packing density and prolongation of recording time.

In consequence, it becomes quite necessary, for reduction of undesirable forces acting against the magnetic tape, to reduce a winding angle applied to each tape guide as much as possible and avoid occurrence of any abrupt directional change of the tape movement. This results, therefore, in an increasing number of tape guides, which in turn may complicate the loading mechanism for tape guide. As disclosed in Japanese Patent Laid-Open No. 160362/80, for example, there has been suggested a conventional loading mechanism a structure of a plurality of rotating rings in combination. In such structure, there involves the necessity to effect the control of the running direction and height of each tape guide so as to prevent the tape from being acted on by any excessive deforming forces, since during the loading operation, the tape is to be wound on each one of the tape guides coming up alternately. Thus, attainment of attitude control for each tape guide will become significantly difficult particularly if the number of tape guides moving when loading is increased. This may be the case especially where the apparatus is to be of compact size. Further there may involve the need in design of a layered arrangement of rotating rings, which also complicates the mechanism and renders it bulky. These problems apparently are obstacles in providing apparatus with compactness in size and due reliabilities in operation.

SUMMARY OF THE INVENTION

The object of the invention, therefore, is to provide a compact tape guide moving mechanism of the type which can attain both the protection of the tape from damage when loading in the wide angle winding system reliability of the mechanism by eliminating those disadvantages of the prior art as described above. According to the invention, the tape guides which move during loading are divided into a first group of tape guides which move in parallel relation to the chassis and a second group of tape guides which move in slanting relation to the chassis. Both of the first and second groups of tape guides moving substantially at the same speed until a first predetermined position is reached, and thereafter the first group of tape guides, which moves in parallel relation to the chassis, moves at a higher speed from the first position to a second and final position while the second group of tape guides, which moves in slanting relation to the chassis, moves from the first predetermined position to the second position substantially at the same speed as they have initially moved to the predetermined position.

With such arrangement according to the invention, there will be assured no occurrence of unduely excessive deforming forces acting upon the magnetic tape trained between the tape guides.

Also, it is advantageously possible to omit the provision of an appropriate tape guide for protection of the magnetic tape against undue deformation, thus attaining simplification of the apparatus to which the invention relates.

DETAILED DESCRIPTION OF THE PREFERRED EMBODIMENTS

Figure 1:
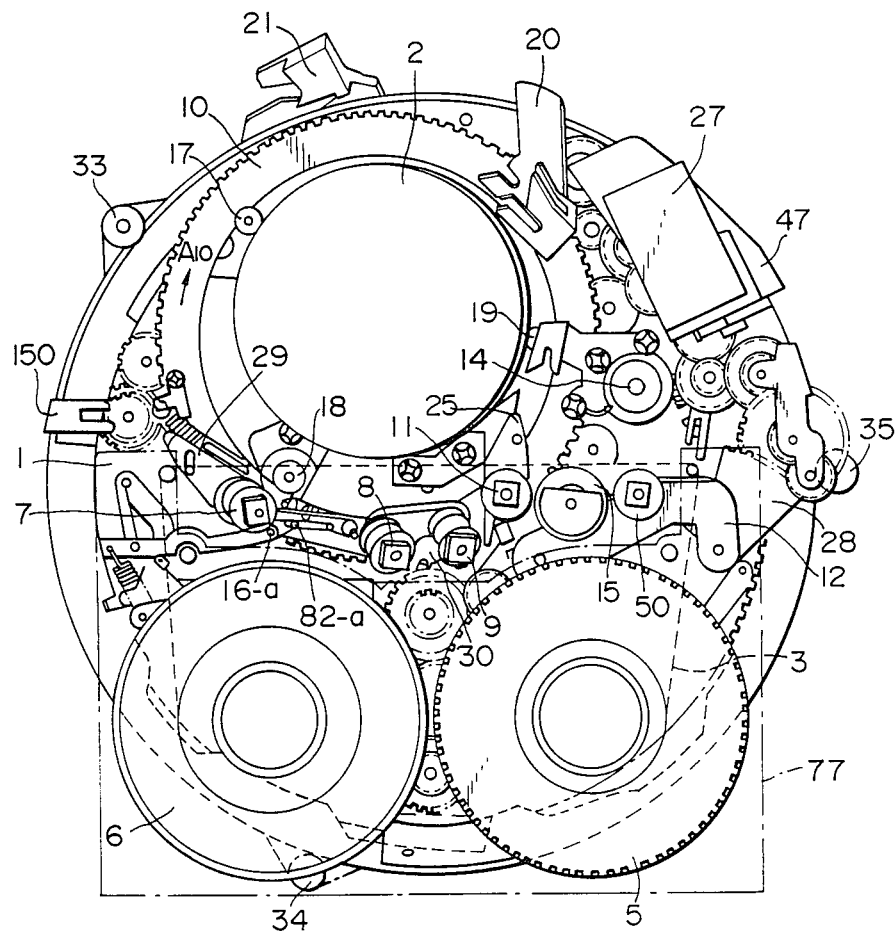
FIG. 1 is a general plan view of apparatus incorporating one embodiment of the invention showing a condition of parts prior to the loading operation with a magnetic tape being set therewithin.

FIG. 1 is a plan view illustrating a general structure of one embodiment according to the invention, which apparatus mounts therein a magnetic tape cartridge 77 shown in phantom and which shows an unloading or stop condition with the magnetic tape being retained within the cartridge. Within this magnetic tape cartridge 77 are housed a take-up reel(T) 5 and a supply reel(S) 6 with the magnetic tape 3 trained therearound, which reels being each secured on a respective reel support journaled for rotation on a chassis 1.

On the disk-shaped chassis 1 are disposed a cylindrical rotary cylinder 2 carrying a plurality of magnetic heads, a loading ring 10, a capstan 14, a tension pin 16-a, a slant guide 82-a which compensates the direction and the height of the running tape, a pinch roller 15, guide rollers 7, 8, 9 and 11, and a loading mode motor 27 in a manner illustrated.

The loading ring 10 is rotatably attached on the chassis 1 by means of L-shaped ring holders. 17 and 19, and is driven by the loading mode motor 27 through a gear train. The loading ring 10 also is provided with a carrier 29 carrying a guide roller 7 and another carrier 30 carrying guide rollers 8 and 9. These carriers 29 and 30 move with rotation of the loading ring 10.

When the loading ring 10 rotates in the $A_{10}$ direction from the FIG. 1 condition, the group of guide rollers 7, 8 and 9 and a guide roller 11 engaging the extreme end of a guide arm 12 are moved, so that the magnetic tape 3 being trained in front of the magnetic tape cartridge 77 is drawn out and wound around the rotary cylinder 2 over a predetermined winding angle.

Figure 2:
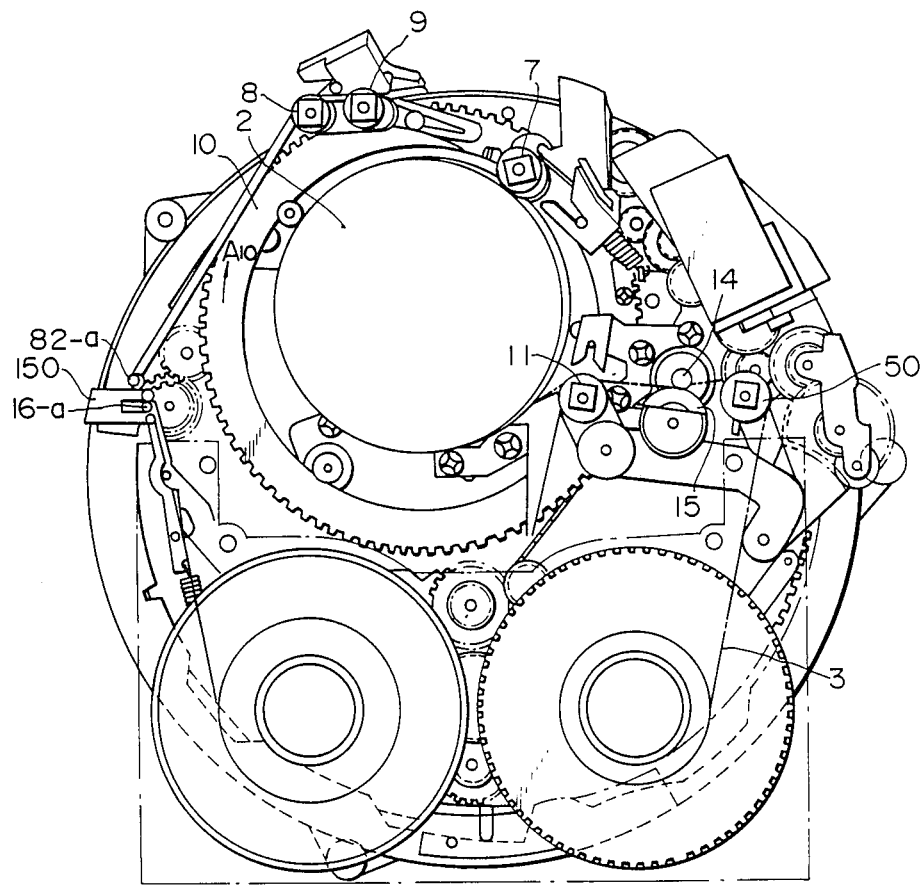
FIG. 2 is a view similar to FIG. 1 however showing a condition of parts after the loading operation has been completed.

FIG. 2 shows in plan view a condition of the apparatus with the magnetic tape having thus been wound around the rotary cylinder 2. In this Figure, the magnetic tape 3, which has been taken out of the supply reel 6 in the tape cartridge 77, is pulled out in parallel relation to the chassis 1 by means of a tension pin 16-a which is moved to a position at guide plate 150, and is the moving direction of the tape altered 1 by means of the slant guide 82-a. Further, the magnetic tape 3 is engaged by guide roller 7, and wound around the rotary cylinder 2. The thus wound tape 3 as it leaves the cylinder 2 is clipped between the capstan 14 and the pinch roller 15 via the guide roller 11, and of its direction changed by a guide roller 50 to be wound around the take-up reel 5 in the cartridge 77. The apparatus will now be described in further detail of its principal parts.

Figure 3:
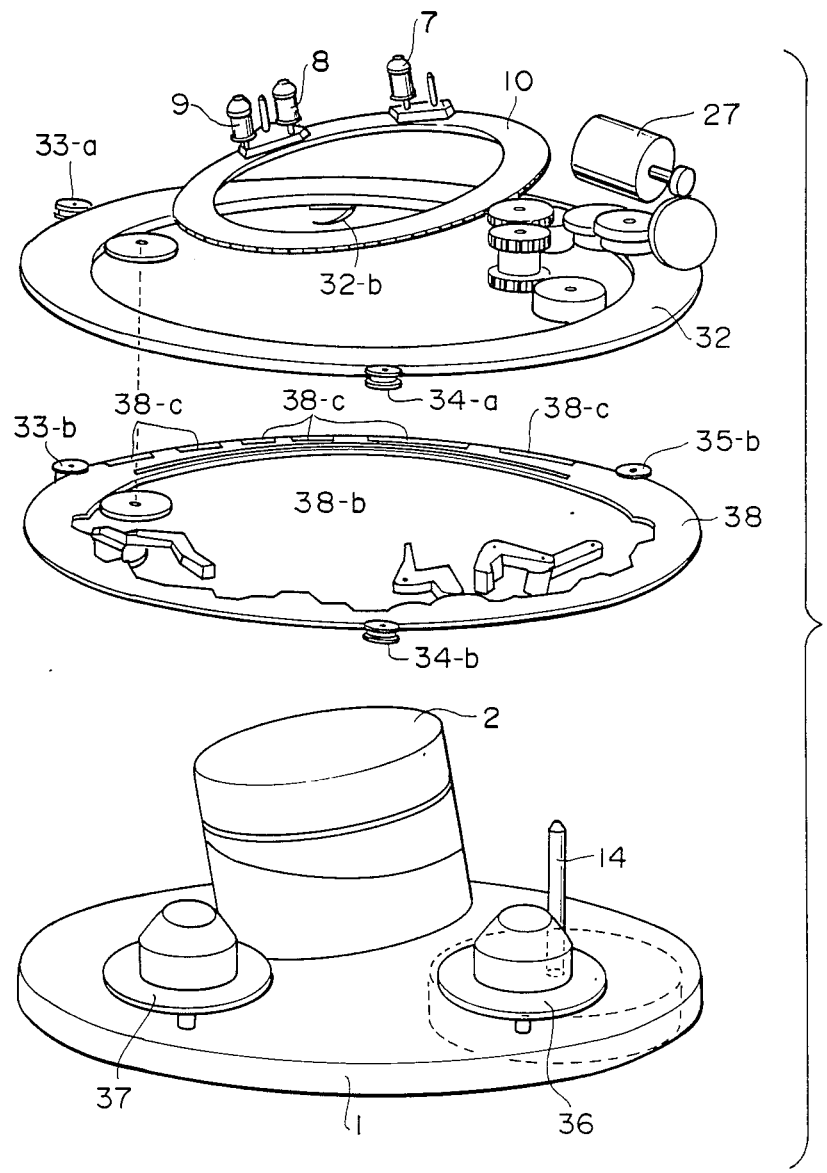
FIG. 3 is a perspective view of partial arrangement, with parts broken away, showing angular relation among a chassis, a cam ring, a drive ring and a loading ring to be assembled.

FIG. 3 shows an exploded perspective view illustrating the manner by which the slanted loading ring 10, the drive ring 32 and the cam ring 38 control the major operation of the apparatus in relation to the chassis 1.

The drive ring 32, cam ring 38 and loading ring 10 are attached on the chassis 1. While the cam ring 38 is attached immediately above or nearest to the chassis 1, and the drive ring 32 is attached above the cam ring 38 (see also FIG. 8), both of the two rings 38, 32 are arranged in parallel to the upper surface of the chassis 1. The loading ring 10 is attached above the drive ring 32 and inclined relative to the chassis 1. (For convenience' sake, the loading ring 10 will be illustrated in further Figures as without its peripheral tooth). Further, the drive ring 32 and the cam ring 38 are retained around their perimeters by ring holders of the two step type, 33-a, 33-b, 34-a, 34-b, and 35-b, and a further ring holder (not shown) behind the gear. The loading ring 10 is retained around its inner periphery by means of L-shaped ring holders 17, 18 and 19 shown in FIG. 1 which have an L-shaped profile.

These three rings are driven by a loading mode motor 27 through a gearing system composed of the following elements.

(1) Loading mode motor 27 (referred to as "LM motor" hereinafter);

(2) Reducing gear train for drive transmission from the LM motor 27 to the drive ring 32;

(3) Transmission gear train for drive transmission from the drive ring 32 to the loading ring 10; and (4) Transmission gear train for drive transmission from the drive ring 32 to the cam ring 38.

This ring device mechanism effects rotation of each ring in that the loading ring 10 carries out the loading operation to wind the magnetic tape around the rotary cylinder 2 while the cam ring 38 carries out mode shifting action for actuation of elements e.g. a brake by means of its camed inner periphery. For the loading operation, further, the loading ring 10 is provided thereon with the carriers 29 and 30 carrying the guide roller 7 and further guide rollers 8 and 9, respectively.

In order to sense the rotational angle attained by the cam ring 38 in the mode shifting action, the cam ring 38 is provided thereon with two conductive patterns 38-b and 38-c (one pattern is continuous and the other intermittent) fabricated in concentric arcs e.g. by using printed circuits, while the drive ring 32 is provided on its lower side with a brush 32-b for establishment of a short-circuit between the two patterns. Regarding the two patterns, the continuous one 38-b leads to the search in the system controlling circuit and the intermittent one 38-c leads to the mode sensing end of the circuit.

The drive ring 32 and the cam ring 38 rotate in opposite direction to each other. Thus, with a change of relative angle between the drive ring 32 and the cam ring 38, there occurs a change of relative position between the brush 32-b and the patterns 38-b, 38-c so that a different part of the intermittent pattern 38-c is connected to earth. Hence, the system control circuit (not shown) senses the angular relation between the two rings.

The chassis 1 is provided with a reel pedestal 37 for driving the supply reel 6 and a further reel pedestal 36 for driving the take-up reel 5. The chassis 1 also provides thereon the rotary cylinder 2 attached in slightly slanting relation to the chassis 1. The magnetic tape 3 is adapted to be wound around this rotary cylinder 2 by means of the guide rollers 7, 8 and 9, etc. Since the loading ring 10 is attached in slanting relation to the chassis 1 as shown in FIG. 3, the magnetic tape 3 is wound slantingly relative to the plane section of the cylinder 2. In order to protect the magnetic tape 3 from being deformed during such slant winding of the tape around the rotary cylinder 2, both the slant guide 82-a and the guide rollers 7, 8, 9 are inclined by a predetermined angle in relation to the chassis. On the other hand, the tension pin 16-a, guide roller 11, pinch roller 15 and the capstan 14 are attached in perpendicular relation to the chassis 1. Accordingly, the magnetic tape 3 is drawn out of the cartridge 77 in parallel to the chassis 1 and perpendicular to the axes of the supply and take-up reels.

SUMMARY OF THE LOADING OPERATION

When starting the loading operation from the FIG. 1 condition of the apparatus, the loading ring 10, together with the first and second carriers 29 and 30, is rotated in the $A_{10}$ direction. At the same time, the tension pin 16-a and slant guide 82-a are moved toward the guide plate 150, while a third carrier is moved toward a third catcher 31 (FIGS. 16, 17) and the pinch roller 15 is moved toward the capstan 14. Through pins 16a, 82a a, and movement of the guide rollers 7, 8, 9 and 11, the magnetic tape 3 is unwound from the cartridge 77. On this occasion, the tension pin 16-a and slant guide 82-a are moved in parallel relation to the chassis 1, thereby unwinding of the tape effected in parallel relation to the chassis 1. The guide roller 11 and pinch roller 15 move in a similar parallel direction. Since the guide rollers 7, 8 and 9 move along with the carriers 29 and 30, the guide rollers 7, 8 and 9 move along the inclined periphery of the loading ring 10 thus pulling out the tape 3 slantingly upwardly of the chassis 1.

Subsequently, the tension pin 16-a and slant guide 82-a reach the guide plate 150 while the third carrier 25 reaches the catcher 31.

The second carrier 30 thus moves along the periphery of the loading ring 10 and stops when the second catcher 21 is reached.

Still thus, the first carrier 29 moves along the periphery of the loading ring 10, stopping when the first catcher 20 is reached.

In this manner and as shown in FIG. 2, the magnetic tape 3 is wound on the rotary cylinder 2 in slanting fashion relative to the plane section of the cylinder, and the loading step thus completed.

Detailed Description of the Loading Operation by the Invention

The loading operation will be next described with regard to the tension pin 16-a, slant guide 82-a and guide roller 7, 8 and 9.

Figure 4:
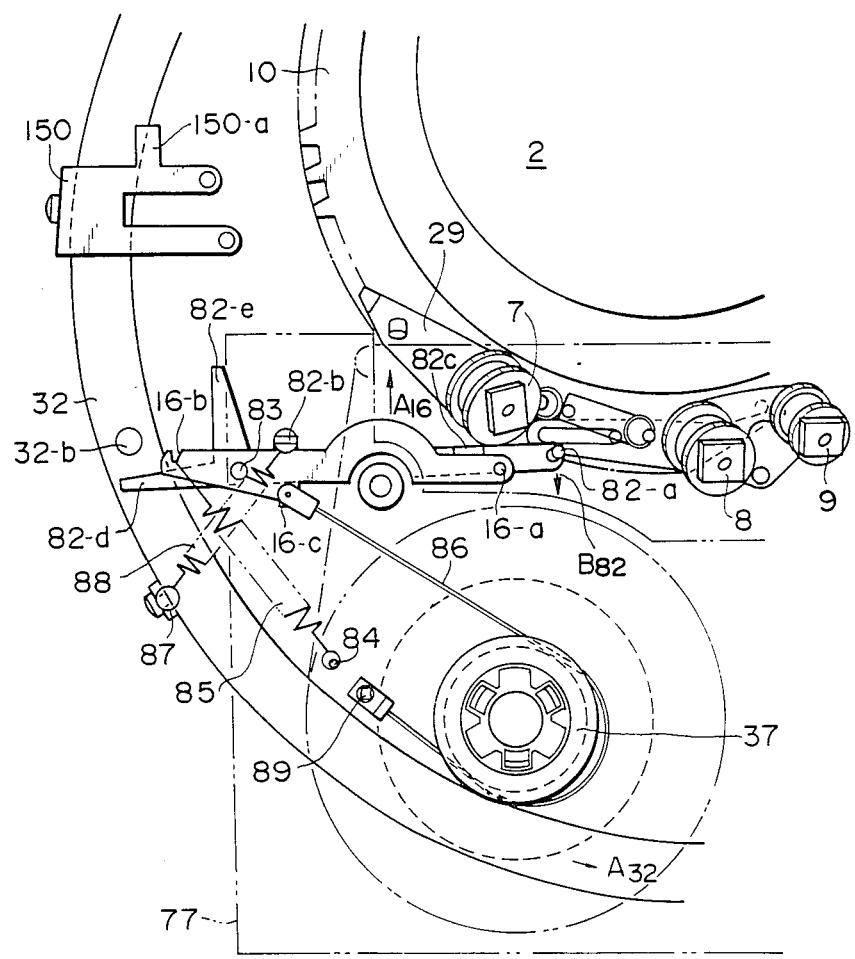
FIG. 4 is a partly enlarged view showing a guide roller portion in FIG. 1.

FIG. 4 shows in fragmentary plan view, relative positions of the tension arm 16 and the arm 82 placed in the non-loading condition shown in FIG. 1. The tension arm 16 and the arm 82 are journaled for rotation on a shaft 83 press fitted into the chassis 1. The tension pin 16-a is press fitted into the extreme end of the tension pin arm 16, and a slant guide 82-a press fitted into the extreme ends of the arm 82, arms 16 and 82 are accommodated behind the magnetic tape 3 as seen in FIG. 4 and span over the opening of the tape cartridge 77.

As shown also in FIG. 1, the guide rollers 7, 8, 9 and 11 and pinch roller 15 are also accommodated behind the tape 3 spanning over the opening of the magnetic tape cartridge 77.

As shown in FIG. 4, a spring 85 is disposed between a notch 16-b formed at one end of the tension arm 16 and a shaft 84 press fitted into the chassis 1 in such manner that the tension arm 16 is biased in the $A_{16}$ direction.

Further, there is provided another spring 88 disposed between a projection 82-b formed on the arm 82 and another projection 87 formed on the peripheral side of the chassis 1 in such manner that the arm 82 is biased in the $B_{82}$ direction. The arm 82 is formed with still another projection 82-c (FIG. 8) kept in contact with the side surface of the tension arm 16.

Accordingly, the relevant parts are at rest in the FIG. 4 condition wherein the rotational torque tending to turn the tension arm 16 counterclockwise due to the force of spring 85 is overcome by the force of spring 88 attached to the arm 82.

The tension arm 16 is formed with a projection 16-c which engages one end of a brake band 86 whose other end being fixed onto the chassis by means of a fastening screw 89. This band brake 86 is trained around the supply reel pedestal 37 in loose manner in the unloading condition, as shown.

Figure 8:
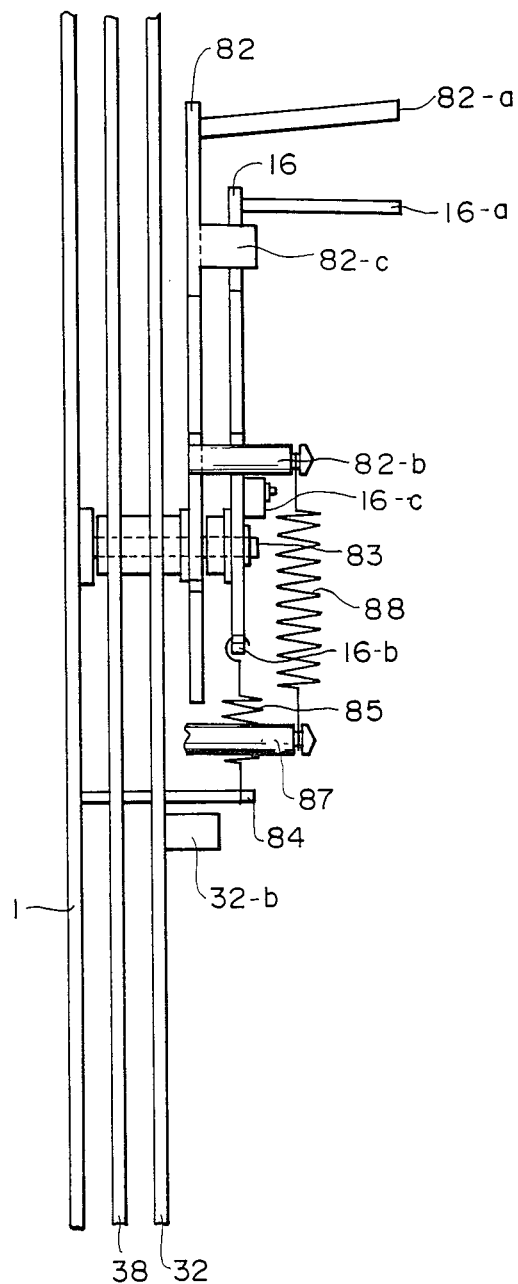
FIG. 8 is a side view showing mounting relation of a drive ring 32, an arm 82 and a tension arm 16 shown in FIG. 7.

It is noted that as shown in FIG. 8, all of the respective ends 16-b and 82-d of those arms and the springs 55 and 88 are disposed sufficiently above the drive ring 32 to avoid direct contact with the latter. The tension pin 16-a is attached on the arm 16 as extending perpendicularly of the plane including the chassis 1, while the pin 82-a is attached on the arm 82 as extending slantingly to the same plane, as shown in FIG. 8.

Figure 5:
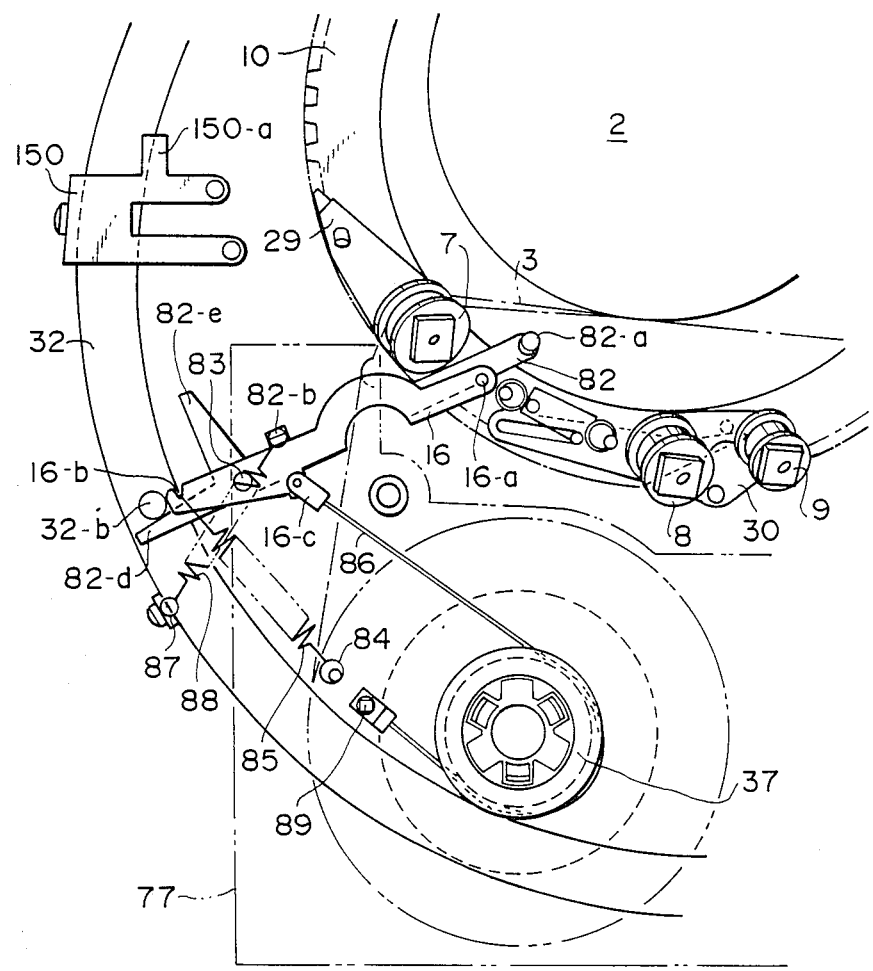
FIG. 5 is a fragmentary plan view showing an initial stage of the loading operation.

When the loading operation is started from the FIG. 4 condition, the drive ring 32 first rotates in the $A_{32}$ direction and its projection 32-b comes in abutting engagement with the end 82-d of the compensation guide arm 82. Hence, the guide arm 82 is oscillated in the $A_{82}$ direction against the biasing force of the spring 88. FIG. 5 shows how the relevant parts i.e. the guide rollers 7, 8 and 9, tension pin 16-a and slant guide 82-a move slightly relatively as the loading ring 10 rotates slightly further from the FIG. 4 condition. In this instance, the magnetic tape 3 is pulled out by the guide roller 7.

As the loading ring 10 rotates further, the guide rollers 7, 8 and 9, tension pin 16-a and slant guide 82-a are moved accordingly so that the tape 3 is further pulled out by the guide roller 7. It is noted, on this occasion, that the guide rollers 7, 8 and 9 move approximately at the same speed as the tension pin 16-a and slant guide 82-a.

Figure 6:
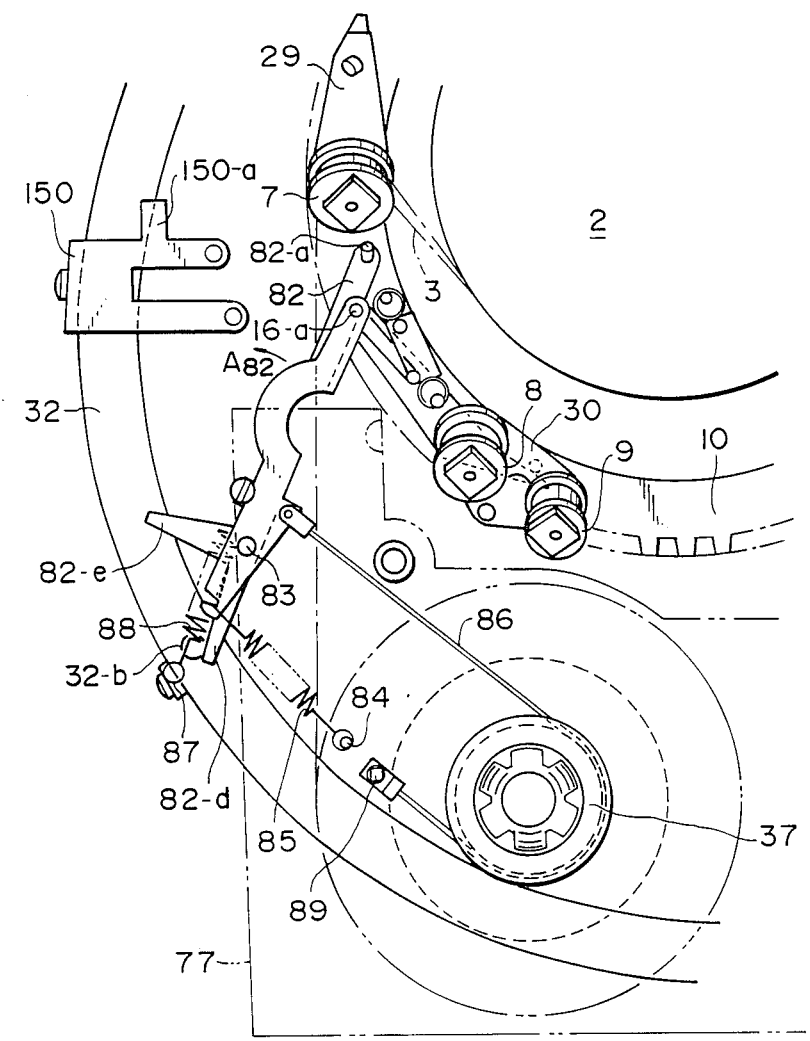
FIG. 6 is a fragmentary plan view similar to FIG. 5 however showing a condition of a next stage of the loading operation.

When the tension pin 16-a and slant guide 82-a move beyond a predetermined distance until a condition of FIG. 6 is reached, then the point of application of the biasing force of the spring 88 is shifted to the left side with respect to a line connecting between the shaft 83 and the projection 87 on the side periphery of the chassis 1. In consequence, the compensation guide arm 82 is biased in the $A_{82}$ direction opposite that in the unloading condition. Hence, as shown, in FIG. 7, the tension pin 16-a and slant guide 82-a move under the influence of the spring 85 at a speed higher than before when under the influence of the spring 88 and projection 32-b. Under this condition, the tape 3 is paid out from the cartridge 77 in parallel relation to the chassis 1 as far as the tension pin 16-a. The arm 82 and tension arm 16 biased by the respective springs 88 and 85 urge the magnetic tape 3 from its base side so that there is defined a predetermined running path of the tape at the exit of the cartridge that is parallel to base 1. In this instance, the arm 82 abuts against the side 150-a of the guide plate 150 to be at a predetermined planar position.

Also, the projection 16-c on the tension arm 16 is rotated in the $A_{16}$ direction, so that the band brake 86 is tightened around the supply reel pedestal 37 with a predetermined tension. Hence, there occurs a predetermined braking torque on the supply reel pedestal 37, so that in record or reproduction made, the magnetic tape 3 being paid out of the supply reel 6 is provided with a proper tension.

Figure 9:
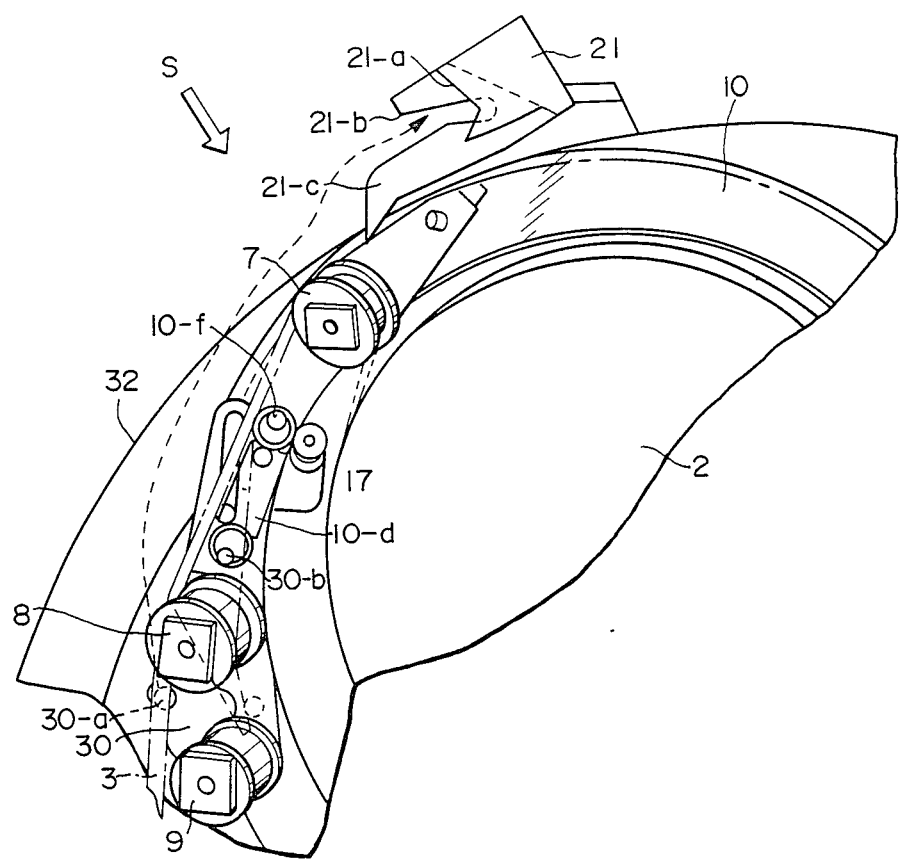
FIG. 9 is a fragmentary plan view showing motion of a second carrier in the loading operation.
Figure 10:
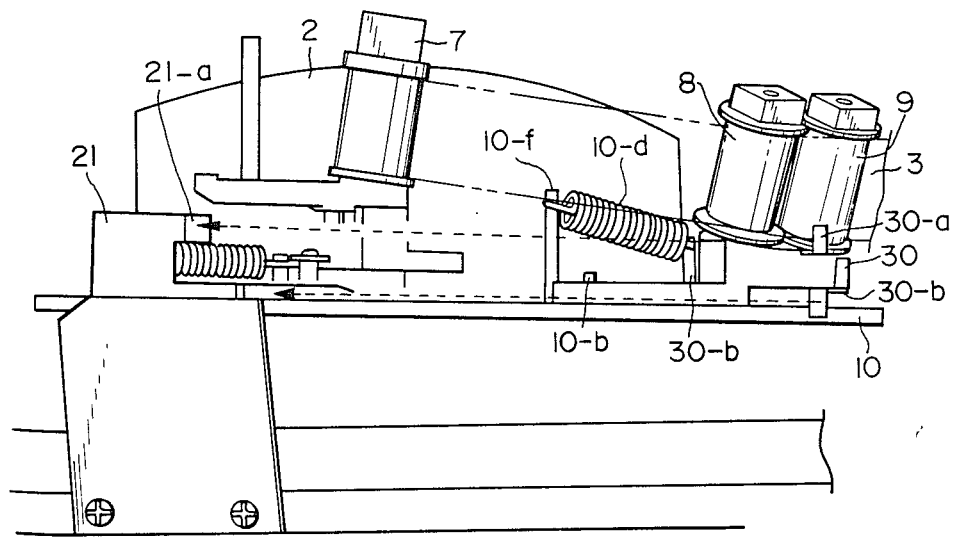
FIG. 10 is a fragmentary side view of FIG. 9 arrangement taken in the S direction.

Meanwhile, the guide rollers 7, 8 and 9 move further. The second carrier 30 carrying the guide rollers 8 and 9 moves toward the second catcher 21 (FIGS. 1, 9) where the rollers are in engagement with tape 3. FIG. 9 shows such movement of the carrier 30 toward the catcher 21 caused by the loading ring 10 that is shown also in FIG. 3. FIG. 10 is a side view of the FIG. 9 taken in the S direction. As shown in FIG. 10, the guide roller 7 moves along the loading ring 10 carrying the tape 3 over its leading edge at all times to wind the tape 3 around the rotary cylinder 2. The guide rollers 8 and 9 also move along the ring 10 in like manner.

Figure 11:
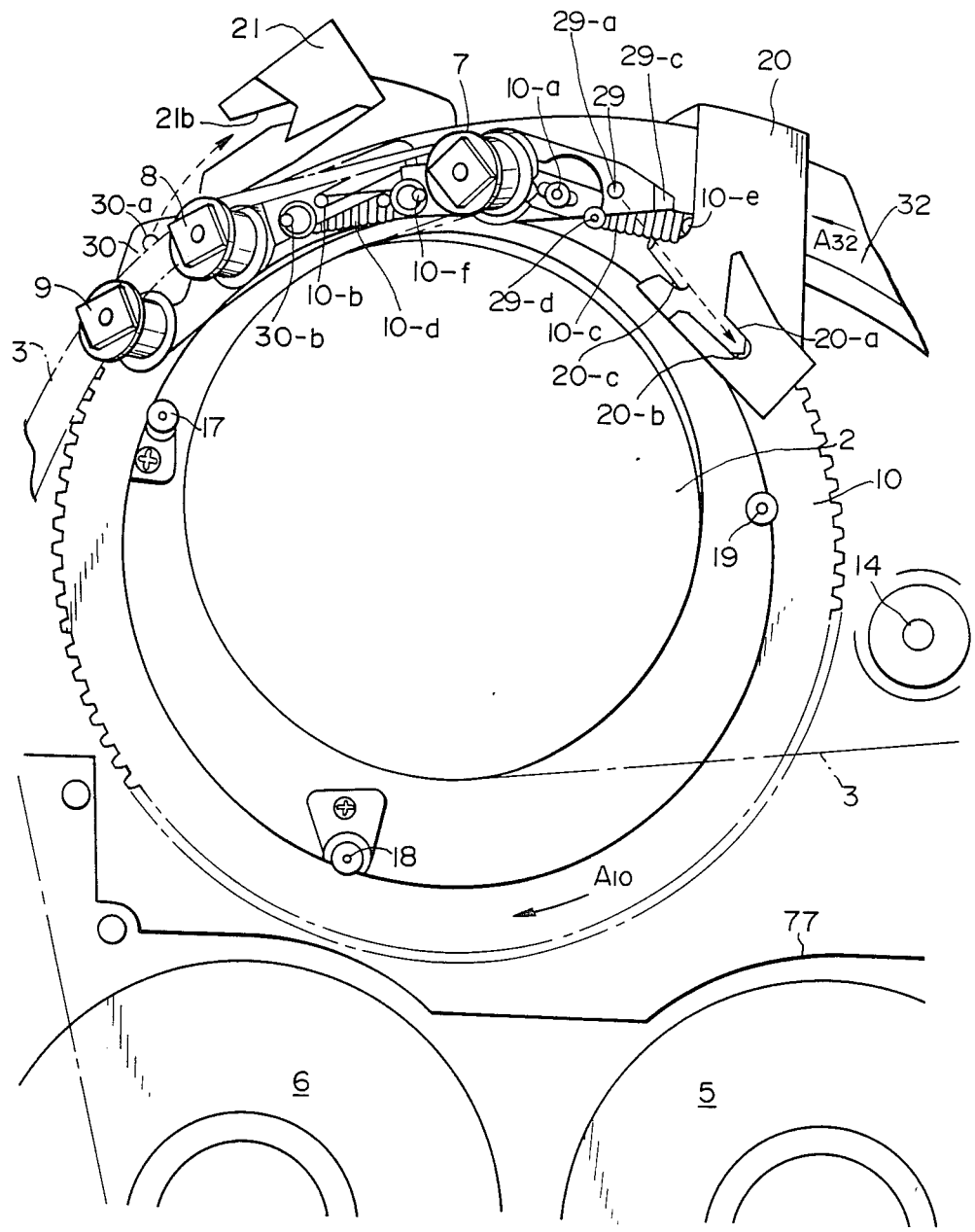
FIG. 11 is a fragmentary plan view showing motion of a first carrier 29 and the second carrier 30 in the loading operation.

FIG. 11 shows in plan view still further movement of the guide rollers 7, 8 and 9. Pins 10-a and 10-b are shown as press fitted into the loading ring 10. These pins are engaged with a predetermined gap in respective elongated slots formed in the first and second carriers 29 and 30.

Further, the first and second carriers 29 and 30 have projections 29-d and 30-b, respectively, and between the projections 10-e and 10-f formed fixed on the loading ring 10, and the first and second carriers 29 and 30, respectively, are disposed springs 10-c and 10-d separately, independently of each other. By these springs 10-c and 10-d, the position of the carrier 29 or 30 relative to the loading ring 10 is determined. Since the carriers 29 and 30 are mounted in such relation to the loading ring 10, the carriers move with the rotational movement of the ring 10 in the $A_{10}$ direction from the FIG. 1 condition, as described above.

Figure 12:
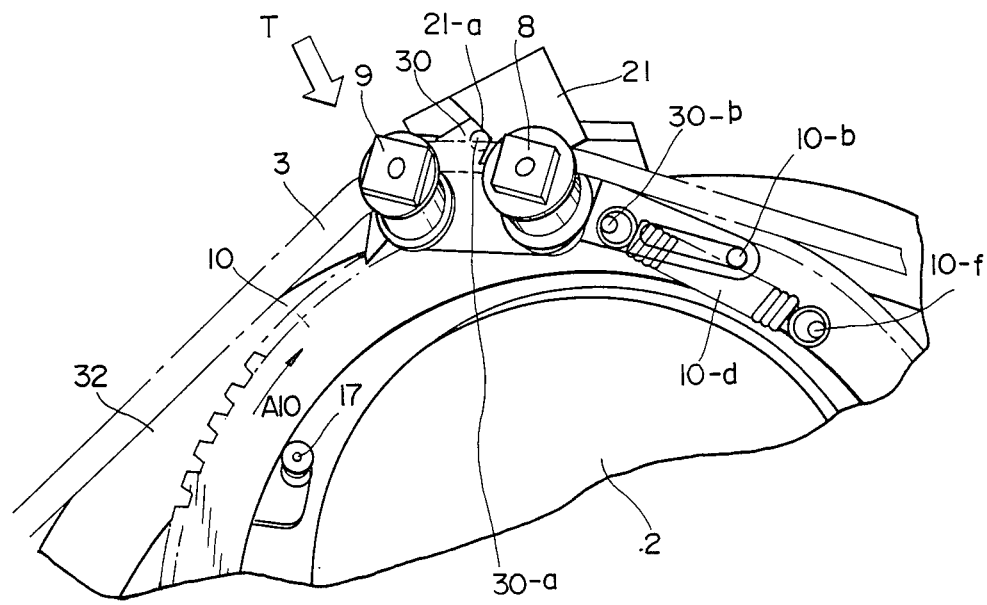
FIG. 12 is a fragmentary plan view showing a secured condition of the second carrier 30 in the loading operation.
Figure 13:
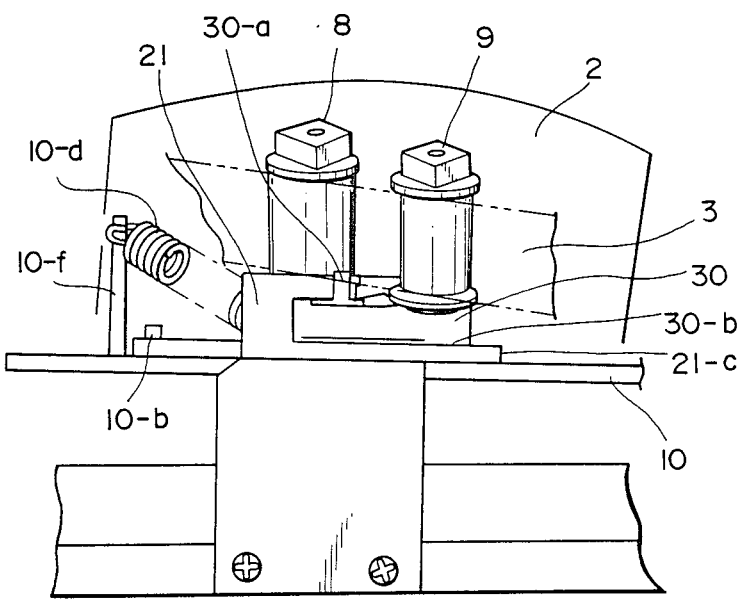
FIG. 13 is a fragmentary side view of FIG. 12 arrangement taken in the T direction.

Through this movement, the tape 3 becomes to be wound gradually around the rotary cylinder 2, as shown in FIG. 13, from the initial condition of being trained over the front of the cassette cartridge 77. The second carrier 30 approaches the second catcher 21 and its pin 30-a passes through a path indicated by broken line into a groove 21 formed on the second carrier 30 being pressed against a V-shaped notch 21-a of the second catcher 21. FIG. 13 is a side view of FIG. 12 arrangement taken in the T direction. In these Figures, the first carrier 29 and guide rollers have been omitted for convenience of illustration. The second carrier 30 will stop when its pin 30-a abuts in the V-shaped notch 21-a.

As shown in FIGS. 12 and 13, even after the pin 30-a abuts in the V-shaped notch 21-a while the bottom of the second carrier 30 contacts the surface 21-c of the second catcher 21, the loading ring 10 rotates further in the $A_{10}$ direction, thus extending the spring 10-d to a predetermined extent so that the second carrier 30 is pressed against the second catcher 21 and secured therein. Through this abutting engagement of the pin 30-a in the V-shaped notch 21, the horizontal position of the guide rollers 7 and 8 is determined. Through the contact of the bottom of the second carrier 30 with the side 21-c of the second catcher 21, the vertical position of the guide rollers is determined. Almost at the same time as the second carrier 30 reaches the second catcher 21, the first carrier 29 reaches the first catcher 20.

Figure 14:
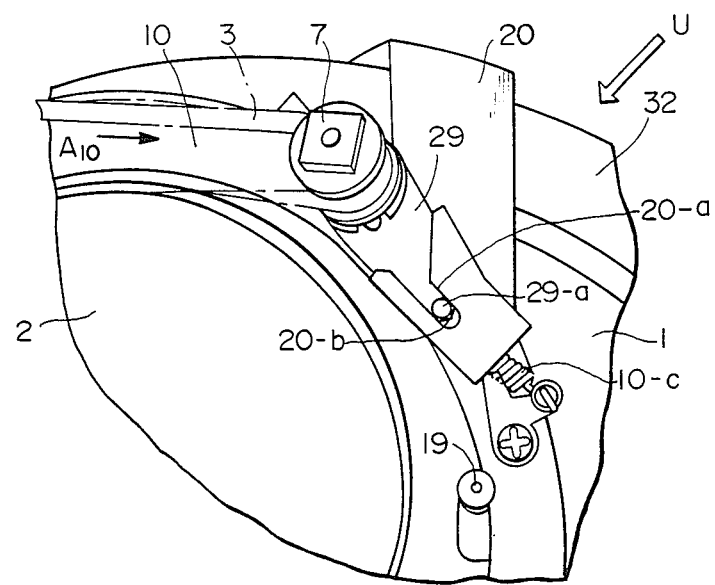
FIG. 14 is a fragmentary plan view showing a secured condition of the first carrier 29.
Figure 15:
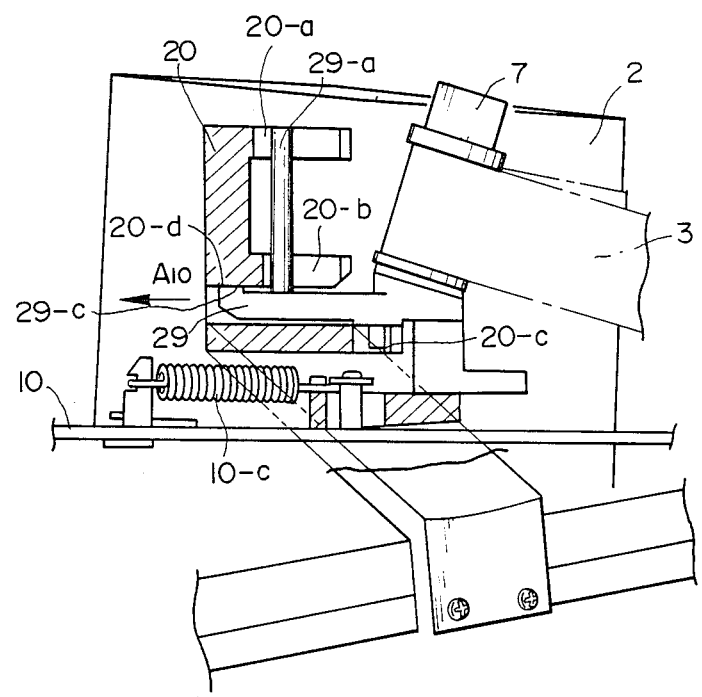
FIG. 15 is a fragmentary side view of FIG. 14 arrangement taken in the U direction.

FIG. 14 shows a top plan view of the first carrier 29 having advanced into the first catcher 20 and abutted thereagainst as the loading ring 10 rotates. FIG. 15 is a side view of the FIG. 14 arrangement taken in the U direction. The first carrier 29 has a positioning pin 29-a press fitted therein, which pin 29-a when approaching the first catcher 20 is guide for changing the moving direction through a U-shaped groove 20-a, V-shaped groove 20-b and U-shaped groove 20-c formed in the upper and lower portions of the catcher 21. At the same time as this, the forward upper extremity 29-c of the first carrier 20 abuts against the lower side 20-d of the first catcher 20, thereby causing an inclination of the first carrier 29 in the fore-and-aft direction. After the correction of the position or positioning in the horizontal and vertical directions has been performed, the loading ring 10 will still further rotate to extend the spring 10-c to a predetermined extent, providing thus the first catcher 20 with a predetermined force for securing the carrier 29.

In the above-described manner, the magnetic tape 3 is wound around the rotary cylinder 2 with the rotation of the loading ring 10.

Description of the Loading Operation at the Pinch Roller area

The loading operation will now be described with particular reference to the function performed by the guide rollers 11 and 50 and pinch roller 15.

Figure 16:
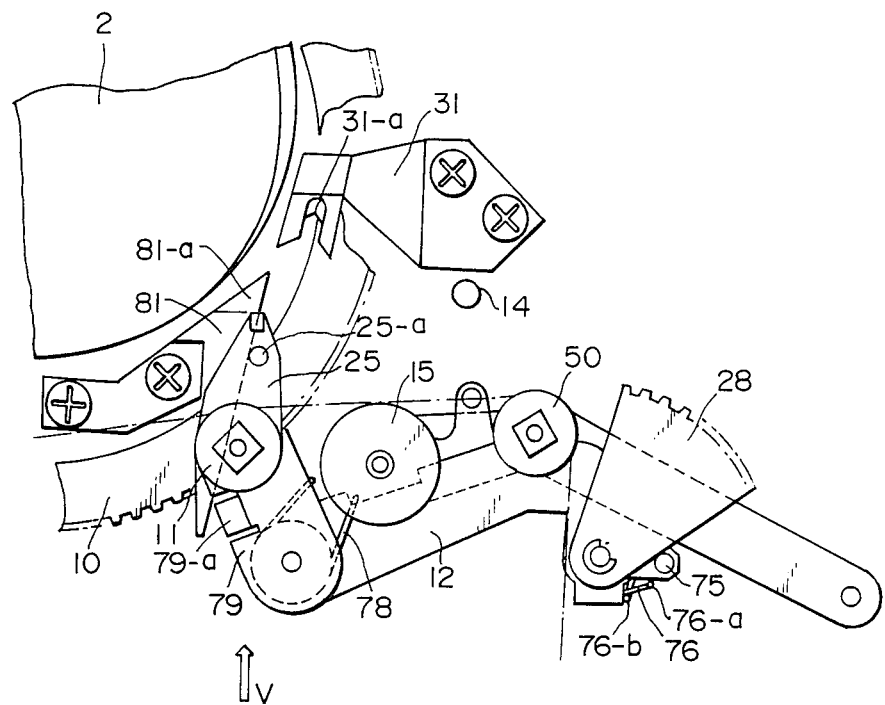
FIG. 16 is a fragmentary plan view showing loading operation by a pinch roller 15 and guide rollers 11, 50.
Figure 17:
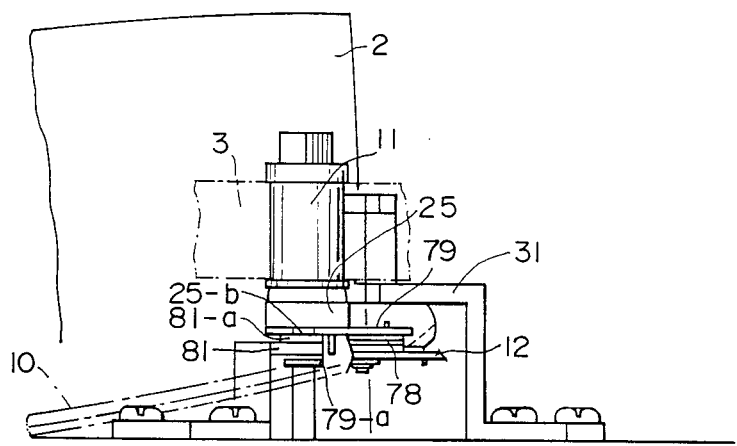
FIG. 17 is a fragmentary side view of FIG. 16 arrangement taken in the V direction.

FIGS. 16 and 17 show relative position of the third catcher 31 and the guide arm 12 which is rotated in operative association with the loading ring 10 by the drive ring 32.

FIG. 16 is a fragmentary plan view showing an earlier stage of the loading operation. FIG. 17 is a fragmentary side view of the FIG. 16 arrangement taken in the V direction.

To the extreme end of the guide arm 12 is connected a lever 9 engaging the third carrier 29 as being biased in the counterclockwise direction by a torsion spring 78. The lever 9 is provided with a pawl-like projection 79-a which is adapted to engage the side wall of a conducting guide 81. This side wall of the guide 81 extends rectilinearly toward the third catcher 31. The side wall of the conducting guide 81 serves to regulate the attitudes of the lever 79 and third carrier 25 during the loading operation.

As the guide arm 12 oscillates, the third carrier 25 moves toward the third catcher 31 and the pin 25-a attached on the third carrier comes into engagement in a V-shaped notch 31-a formed on the catcher 31.

Figure 18:
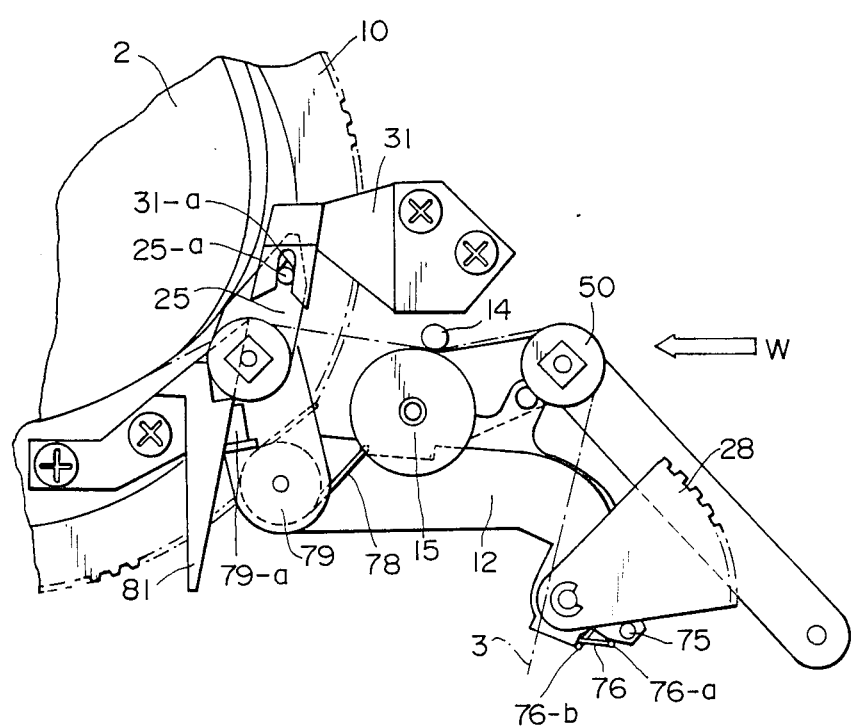
FIG. 18 is a plan view showing motion of a third carrier 25 in the loading operation.
Figure 19:
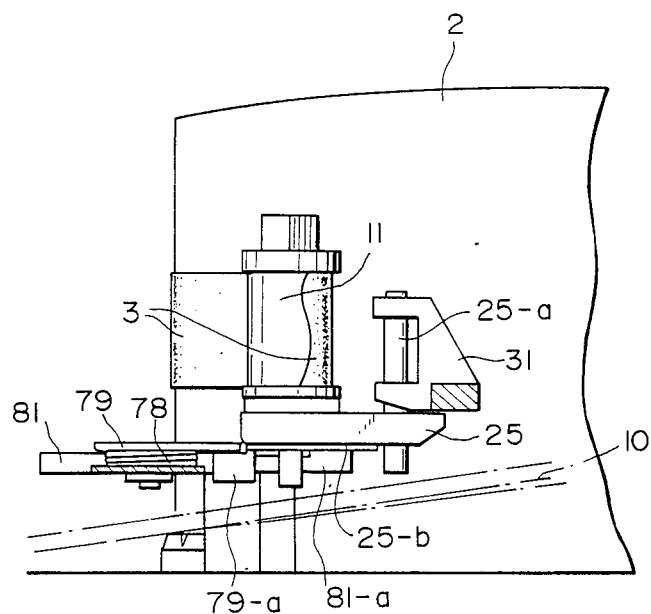
FIG. 19 is a fragmentary side view showing a secured condition of the third carrier 25 in the loading operation.

FIG. 18 is a fragmentary plan view showing the pin 25-a on the third carrier 25 having engaged midway in the V-shaped notch 31-a formed on the third catcher 31. FIG. 19 is a fragmentary side view of the FIG. 18 arrangement taken in the W direction. In FIG. 19, there are shown only principal parts, the pinch roller 15 and guide roller 50 being omitted. In FIGS. 18 and 19, the lateral position of the third carrier 25, whose pin 25-a has been engaged in the V-shaped notch 31-a provided on the third catcher 31, is thus determined, and its vertical position is determined by contact of the lower side 25-b of the carrier 25 with a partly protruding surface 81-a formed on the extreme end of the conducting guide 81.

Further, even after the third carrier 25 has fully engaged in the V-shaped notch 31-a on the third catcher, a segment gear 28 rotates to a predetermined angular extent so that one end 76-a of a torsion spring 76 is urged by the segment 28. Thus the third carrier 25 is securely pressed against the third catcher 31 for positive positioning of the carrier.

Through the manner of operation described so far, the magnetic tape 3 is loaded on the rotary cylinder 2. The pinch roller 15 is actuated substantially in operative association with the guide arm 12 in that the roller 15 is pressed against the capstan 14 with the magnetic tape 3 sandwiched therebetween.

Figure 7:
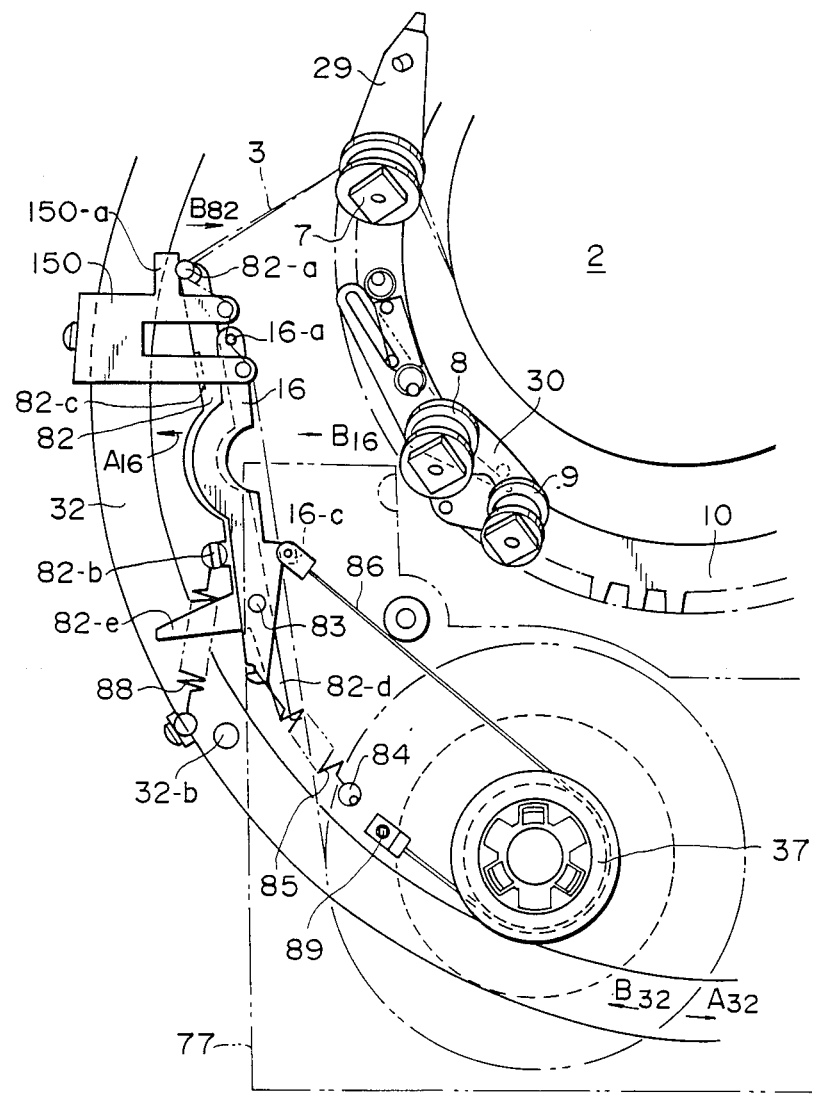
FIG. 7 is a fragmentary plan view similar to FIG. 5 however showing a condition of a still next stage of the loading operation.

When it is desired to perform the unloading operation under this condition of the loading being completed, the drive ring 32 is rotated in the $B_{32}$ direction thereby to cause its projection 32-b to urge against the projection 82-e of the arm 82 (see FIG. 7). Hereupon the arm 82 oscillates in the $B_{82}$ direction against the biasing force of the spring 88. And, the tension arm 16 also oscillated in the $B_{16}$ direction under urging by the projection 82-c on the arm 82.

When this oscillatory angle exceeds a predetermined value, the compensation guide arm 82 now is biased by the spring 88 in the $B_{82}$ direction, contrary to that in the loading operation, and as shown in FIG. 4, its extreme end is again restored to the condition where it is accommodated in the opening of the magnetic tape cartridge 77.

Through the above-described operation of tape loading, press fitting of the guide rollers and positioning thereof caused by the rotation of the drive ring 32, there will be defined a path for running tape as shown in FIG. 2, along which such procedures as recording (reproduction), rewinding, fast forward, etc.

Drive Mechanism for the Loading Ring 10 and Drive Ring 32

Figure 20:
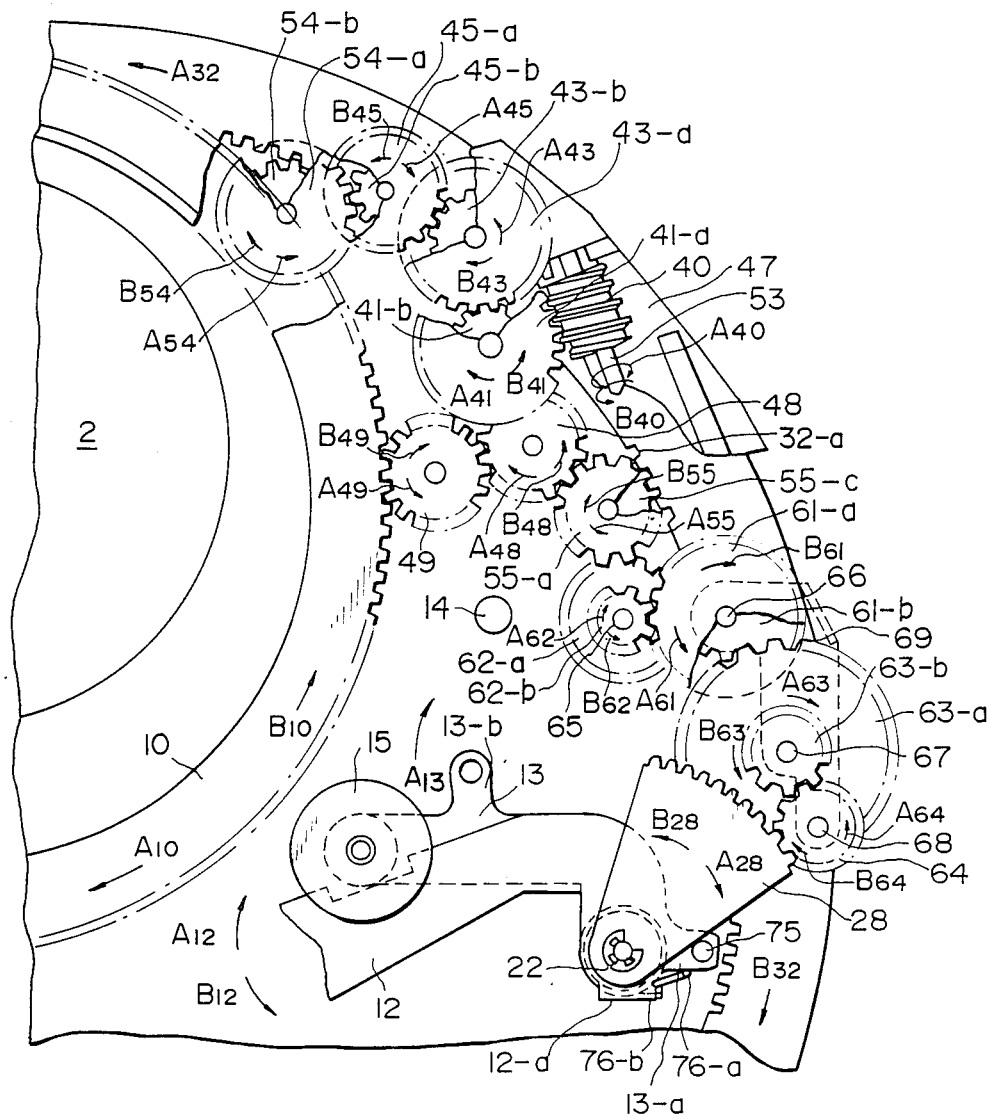
FIG. 20 is a fragmentary view showing a structure of a gearing for drive of the loading ring 10 and drive ring 3.

FIG. 20 shows, in plan view, a reducing gear train connected between the LM motor 27 (not shown) and the drive ring 32, and transmission gear trains connected between the drive ring and the loading ring 10, and between the drive ring and the guide arm 12, respectively. When the LM motor 27 is actuated to rotate a worm gear 40 in the $A_{40}$ direction, reduction gears 41, 42, 45 and 54 are driven in the rotational sense of $A_{41}$, $A_{43}$, $A_{45}$ and $A_{54}$, respectively. Hence, the drive ring 32 is rotated by a lower gear 54-b integral with the reduction gear 54 in the $A_{32}$ direction. This causes a lower gear 55-c of a first change gear 55 to rotate in the $A_{55}$ direction and an upper integral gear 55-a also rotates in the $A_{55}$ direction, thereby transmission gears 48 and 49 on a LM motor holder 47 are caused to rotate in the $A_{48}$ and $A_{49}$ directions, respectively. With the rotation of this transmission gear 49 in the $A_{49}$ direction, the loading ring 10 is rotated in the $A_{10}$ direction.

The transmission gears train 55, 48, 49 for transmitting the rotation of the drive ring 10 to the loading ring 10 is advantageously provided with a switch mechanism incorporating Geneva gears so that when the rotational torque of the drive ring 32 is unnecessary, the transmission of power is cut off. The same is applied to the transmission gear train for transmitting the rotation of the drive ring 32 to the cam ring 38.

Figure 21:
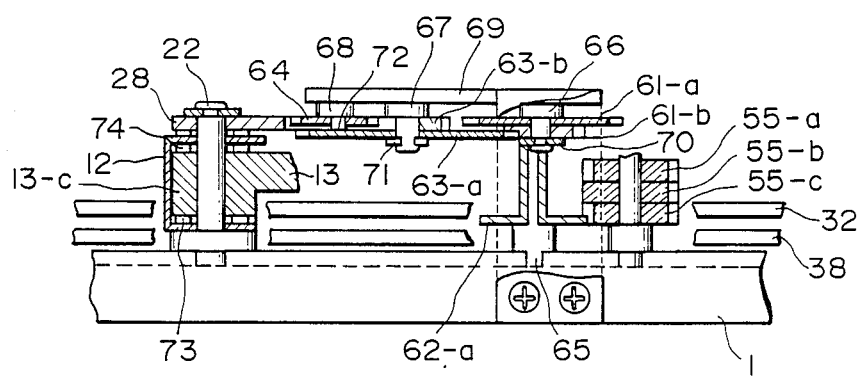
FIG. 21 is a fragmentary side view of the same structure.

Next, a transmission gear train 61, 62, 63, etc disposed in the lower portion, viewed in FIG. 20, will be described of its operation with additional reference to FIG. 21 shown in a half section of the FIG. 20 arrangement taken from the right side.

In FIGS. 20 and 21, the middle gear 72 journaled on a shaft 65 press fitted into the chassis 1, its lower integral gear 62-a meshing with the upper gear 61-a of the two-staged gear 61. These gears 61, 63 and 64 are rotatably journaled on respective shafts 66, 67 and 68 press fitted into a gear holder 69 secured on the side of the chassis 1 by means of respective retaining rings 70, 71 and 72.

Further, the boss portion 13-c of the pinch roller arm 13 is clamped in the rotating center portion of a U-shaped section of the guide arm 12 via spacers 72 and 74, and is rotatably journaled on a shaft 22 on the chassis 1 together with the guide arm 12 and segment 28.

In FIG. 20, the torsion spring 76 is trained around the cylindrical periphery of the boss portion 13-c of the pinch roller arm 13 somewhat loosely. Its one end 76-a is retained by the projection 13-a of the pinch roller arm 13 and the other end 76-b is retained by a connecting portion 12-a of the U-shaped section of the guide arm 12. This torsion spring 76 acts to bias the projection 13-a of the pinch roller arm 13 and the connection 12-a of the guide arm away from each other.

With such arrangement mentioned above, when the drive ring 32 rotates in the $A_{32}$ direction, the gears 62-a, 52-b; 61-a, 61-b; 63-a, 63-b are rotated in the $A_{62}$, $A_{61}$ and $A_{63}$ directions, respectively, through the intermediary of the lower gear 55-c of the first change gear 55, thus the segment 28 being driven in the $A_{28}$ direction. Consequently, the pin 75 on the pinch roller arm 13 is urged by the side surface of the segment 28, causing rotation of the pinch roller arm 13 in the $A_{13}$ direction. Further, in this instance, the guide arm 12 is caused to rotate in the $A_{12}$ direction under the influence of an elastic reaction of the torsion spring 76.

In this manner, the rotation of the LM motor 27 is transmitted through the drive ring 32 to the loading ring 10 and guide arm 12 for performance of the loading operation.

What is claimed is:

1. A tape guide moving mechanism for use with magnetic tape reproducing apparatus having a cylindrical cylinder mounted with a rotatable magnetic head thereon, said magnetic record reproduction apparatus receiving a magnetic tape cartridge including a tape, a supply reel loaded with said magnetic tape, and a take-up reel, said tape guide moving mechanism being adapted to draw the magnetic tape from said tape cartridge and to wind said magnetic tape on a cylindrical outer surface of said cylinder, said tape guide moving mechanism comprising:

a first group of tape guides having pins for maintaining a running path of said magnetic tape in a manner such that, when the magnetic tape is loaded on said cylinder, the magnetic tape is drawn from said magnetic tape cartridge in a direction lying in a plane that is perpendicular to a rotation axis of said supply reel, drive means for controlling movement of said pins in a plane perpendicular to the direction of the rotational axis of said supply reel slowly to a first predetermined position and thereafter to a second predetermined position at a higher speed, said means being in engagement with said magnetic tape before reaching said second predetermined position for maintaining the running path for the magnetic tape from said tape cartridge to said second predetermined position in a direction substantially perpendicular to the rotational axis of said supply reel;

a second group of tape guides having a plurality of guide rollers, in which while the pins of said first tape guide group move to said first predetermined position, said guide rollers move slantingly along the cylindrical outer surface of said cylinder while continuously drawing said magnetic tape from said magnetic tape cartridge, and after said pins of the first group of tape guides have moved to said second predetermined position, said guide rollers continue moving slantingly along the cylindrical outer surface of said cylinder so as to wind the magnetic tape slantingly on the outer cylindrical surface of said cylinder while continuously drawing the magnetic tape from said cassette;

means at a third predetermined position at which said guide rollers stop for establishing and maintaining a running path for the magnetic tape which extends slantingly on the outer cylindrical surface of the cylinder;

a loading mechanism for driving said first and second groups of tape guides; and a drive mechanism having a motor and power transmitting gears arranged to transmit power to said loading mechanism.

2. A mechanism as recited in claim 1, further characterized in that said pins of the first group of tape guides include a tension pin and a slant guide;

said tension pin being mounted on a tension arm which is movable in a direction on a plane perpendicular to the rotational axis of said supply reel;

said slant guide being engaged with a slant guide arm which is movable together with said tension arm also in a plane perpendicular to the rotational axis of said supply reel, said slant guide having a tape engaging surface which is slanted to be angularly related to said supply reel axis whereby when said magnetic tape is wound on said cylinder, said tension pin is located closer to said magnetic tape cartridge than said slant guide so as to maintain a running path of the magnetic tape drawn from said supply reel in a direction perpendicular to the rotational axis of said supply reel, and said slant guide establishes a running path for the magnetic tape that is not perpendicular to the supply reel axis which path extends from said tension pin to one of said guide rollers.

3. A mechanism as recited in claim 1 further comprising a loading ring disposed slantingly around the outer cylindrical surface of said cylinderical cylinder, said loading ring carrying thereon said guide rollers of said second group of tape guides, the rotation of said loading ring about a center axis thereof causing said guide rollers to move so that a magnetic tape is drawn from the tape cartridge by one of said guide rollers and wound around the cylinder.

4. A mechanism as recited in claim 2 further comprising a loading ring disposed slantingly around the outer cylindrical surface of said cylindrical cylinder, said loading ring carrying thereon said guide rollers of said second group of tape guides, the rotation of said loading ring about a center axis thereof causing said guide rollers to move so that a magnetic tape is drawn from the tape cartridge by one of said guide rollers and wound around the cylinder.

5. A mechanism as recited in claim 3 wherein said second group of tape guides comprises first, second and third guide rollers, said first guide rollers being attached to a first carrier which is carried by said loading ring while said second and third guide rollers are attached to a second carrier which is carried by said loading ring whereby when the loading operation is completed, the second and third guide rollers are operative to alter the moving direction of the magnetic tape while the first guide roller is operative to reverse the moving direction of the magnetic tape so that the magnetic tape is wound around the cylindrical outer surface of said cylinder.

6. A mechanism as recited in claim 4 wherein said second group of tape guides comprises first, second and third guide rollers, said first guide roller being attached to a first carrier which is carried by said loading ring while said second and third guide rollers are attached to a second carrier which is carried by said loading ring whereby when the loading operation is completed, the second and third guide rollers are operative to alter the moving direction of the magnetic tape while the first guide roller is operative to reverse the moving direction of the magnetic tape so that the magnetic tape is wound around the cylindrical outer surface of said cylinder.

7. A mechanism as recited in claim 1 further comprising a capstan for moving said magnetic tape at a predetermined speed, a pinch roller for pressing the magnetic tape against said capstan, and a fourth guide roller for defining the running path for the magnetic tape between said cylinder and the capstan.

8. A mechanism as recited in claim 2 further comprising a capstan for moving said magnetic tape at a predetermined speed, a pinch roller for pressing the magnetic tape against said capstan, and a fourth guide roller for defining the running path for the magnetic tape between said cylinder and the capstan.

9. A mechanism as recited in claim 3 further comprising a capstan for moving said magnetic tape at a predetermined speed, a pinch roller for pressing the magnetic tape against said capstan, and a fourth guide roller for defining the running path for the magnetic tape between said cylinder and the capstan.

10. A mechanism as recited in claim 4 further comprising a capstan for moving said magnetic tape at a predetermined speed, a pinch roller for pressing the magnetic tape against said capstan, and a fourth guide roller for defining the running path for the magnetic tape between said cylinder and the capstan.

11. A mechanism as recited in claim 5 further comprising a capstan for moving said magnetic tape at a predetermined speed, a pinch roller for pressing the magnetic tape against said capstan, and a fourth guide roller for defining the runing path for the magnetic tape between said cylinder and the capstan.

12. A mechanism as recited in claim 6, further comprising a capstan for moving said magnetic tape at a predetermined speed, a pinch roller for pressing the magnetic tape against said capstan, and a fourth guide roller for defining the running path for the magnetic tape between said cylinder and the capstan.

13. A tape guide moving mechanism for use with magnetic tape reproducing apparatus having a cylindrical cylinder mounted with a rotatable magnetic head thereon, said magnetic record reproduction apparatus receiving a magnetic tape cartridge including a tape, a supply reel loaded with said magnetic tape, and a take-up reel, said tape guide moving mechanism being adapted to draw the magnetic tape from said tape cartridge and to wind said magnetic tape on a cylindrical outer surface of said cylinder, said tape guide moving mechanism comprising:

first and second groups of tape guides;

said first group of tape guides being adapted for maintaining a running path of said magnetic tape in a manner such that when the magnetic tape is loaded on said cylinder, the magnetic tape is drawn from said magnetic tape cartridge in a direction perpendicular to a rotational axis of said supply reel, means to cause said first group of tape guides to move at a slow speed to a first predetermined position while said second group of tape guides also moves, and said first group of tape guides to move from said first position to a second predetermined position at a higher speed while carrying said magnetic tape, and means for stopping said first group of tape guides at said second predetermined position for maintaining said path for the magnetic tape from the magnetic tape cartridge to said second predetermined position, with the tape path lying in a plane perpendicular to the rotational axis of said supply reel;

second group of tape guides having a plurality means to cause said guide rollers, means to cause said guide rollers to move along the cylindrical outer surface of said cylinder while continuously drawing said magnetic tape from said magnetic tape cartridge and while said first tape guide group moves to said first position, and after said first group of tape guides has moved to said second predetermined position, to cause said guide rollers to continue to move slantingly along the cylindrical outer surface of said cylinder so as to wind the magnetic tape slantingly on the outer cylindrical surface of the cylinder while continuously drawing magnetic tape from said magnetic tape cartridge, and means to cause said guide rollers to stop at a third predetermined position for maintaining the path for the magnetic tape that has been wound slantingly on the outer cylindrical surface of the cylinder;

a loading mechanism for driving said first and second groups of tape guides; and a drive mechanism having a motor and power transmitting gears and adapted to transmit power to said loading mechanism.

14. A mechanism as recited in claim 13, further characterized in that said pins of the first group of tape guides include a tension pin and a slant guide;

said tension pin being mounted on a tension arm which is movable in a direction on a plane perpendicular to the rotational axis of said supply reel;

said slant guide being engaged with a slant guide arm which is movable together with said tension arm also in a plane perpendicular to the rotational axis of said supply reel, said slant guide having a tape engaging surface which is slanted to be angularly related to said supply reel axis whereby when said magnetic tape is wound on said cylinder, said tension pin is located closer to said magnetic tape cartridge than said slant guide so as to maintain a running path of the magnetic tape drawn from said supply reel in a direction perpendicular to the rotational axis of said supply reel, and said slant guide establishes a running path for the magnetic tape that is not perpendicular to the supply reel axis which path extends from said tension pin to one of said guide rollers.

15. A mechanism as recited in claim 13 further comprising a loading ring disposed slantingly around the outer cylindrical surface of said cylindrical cylinder, said loading ring carrying thereon said guide rollers of said second group of tape guides, the rotation of said loading ring about a center axis thereof causing said guide rollers to move so that a magnetic tape is drawn from the tape cartridge by one of said guide rollers and wound around the cylinder.

16. A mechanism as recited in claim 14 further comprising a loading ring disposed slantingly around the outer cylindrical surface of said cylindrical cylinder, said loading ring carrying thereon said guide rollers of said second group of tape guides, the rotation of said loading ring about a center axis thereof causing said guide rollers to move so that a magnetic tape is drawn from the tape cartridge by one of said guide rollers and wound around the cylinder.

17. A mechanism as recited in claim 15 wherein said second group of tape guides comprises first, second and third guide rollers, said first guide roller being attached to a first carrier which is carried by said loading ring while said second and third guide rollers are attached to a second carrier which is carried by said loading ring whereby when the loading operation is completed, the second and third guide rollers are operative to alter the moving direction of the magnetic tape while the first guide roller is operative to reverse the moving direction of the magnetic tape so that the magnetic tape is wound around the cylindrical outer surface of said cylinder.

18. A mechanism as recited in claim 16 wherein the second group of tape guides comprises first, second and third guide rollers, said first guide roller being attached to a first carrier which is carried by said loading ring while said second and third guide rollers are attached to a second carrier which is carried by said loading ring whereby when the loading operation is completed, the second and third guide rollers are operative to alter the moving direction of the magnetic tape while the first guide roller is operative to reverse the moving direction of the magnetic tape so that the magnetic tape is wound around the cylindrical outer surface of said cylinder.

19. A mechanism as recited in claim 13 wherein the second group of tape guides comprises first, second and third guide rollers, said first guide roller being attached to a first carrier which is carried by said loading ring while said second and third guide rollers are attached to a second carrier which is carried by said loading ring whereby when the loading operation is completed, the second and third guide rollers are operative to alter the moving direction of the magnetic tape while the first guide roller is operative to reverse the moving direction of the magnetic tape so that the magnetic tape is wound around the cylindrical outer surface of said cylinder.

20. A mechanism as recited in claim 14, wherein the second group of tape guides comprises first, second and third guide rollers, said first guide roller being attached to a first carrier which is carried by said loading ring while said second and third guide rollers are attached to a second carrier which is carried by said loading ring whereby when the loading operation is completed, the second and third guide rollers are operative to alter the moving direction of the magnetic tape while the first guide roller is operative to reverse the moving direction of the magnetic tape so that the magnetic tape is wound around the cylindrical outer surface of said cylinder.

* * * * *